US010798274B2

(12) United States Patent
Salemnia

(10) Patent No.: US 10,798,274 B2
(45) Date of Patent: *Oct. 6, 2020

(54) BODY MOUNTED CAMERA SYSTEM

(71) Applicant: Sam Salemnia, Los Angeles, CA (US)

(72) Inventor: Sam Salemnia, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/785,154

(22) Filed: Feb. 7, 2020

(65) Prior Publication Data

US 2020/0177772 A1    Jun. 4, 2020

Related U.S. Application Data

(63) Continuation of application No. 15/342,068, filed on Nov. 2, 2016, now Pat. No. 10,630,871.

(Continued)

(51) Int. Cl.
*H04N 5/225* (2006.01)
*H04N 5/232* (2006.01)
(Continued)

(52) U.S. Cl.
CPC ......... *H04N 5/2252* (2013.01); *H04N 5/2257* (2013.01); *H04N 5/23203* (2013.01);
(Continued)

(58) Field of Classification Search
CPC ...... H04N 5/2252; H04N 5/2257; H04N 5/77; H04N 5/23203; H04N 5/23241;
(Continued)

(56) References Cited

U.S. PATENT DOCUMENTS 5,829,652 A * 11/1998 Denzer ............... A45F 3/14
224/270
6,687,523 B1 * 2/2004 Jayaramen ......... A41D 13/1281
600/388

(Continued)

FOREIGN PATENT DOCUMENTS

EP    3305120 A1 *  4/2018  ......... G04B 37/1486
EP    3305120 A1     4/2018
(Continued)

OTHER PUBLICATIONS

Lifen et al. "MS5534B pressure sensor and its height measurement applications" 2011 International Conference of Information Technology, Computer Engineering and Management Sciences, 2011 IEEE (Year: 2011).*

*Primary Examiner* — Richard A Hansell, Jr.
(74) *Attorney, Agent, or Firm* — Lewis Roca Rothgerber Christie LLP

(57) ABSTRACT

A body mounted camera system may include a band structure having an inner surface positionable against a user's body, an outer surface facing away from the user's body, and an interior cavity between the inner surface and the outer surface; a camera within the interior cavity including a lens exposed through the outer surface of the band structure; a controller within the interior cavity for controlling the camera, the controller including an interconnection module for connecting to an outside device; a power source within the interior cavity for powering the controller and the camera; and electrical connections connecting the controller, the power source, and the camera.

20 Claims, 3 Drawing Sheets

Related U.S. Application Data

(60) Provisional application No. 62/250,356, filed on Nov. 3, 2015.

(51) Int. Cl.
  *H04N 5/77* (2006.01)
  *H04N 5/907* (2006.01)

(52) U.S. Cl.
  CPC ........... *H04N 5/23241* (2013.01); *H04N 5/77* (2013.01); *H04N 5/772* (2013.01); *H04N 5/907* (2013.01); *H04N 5/23212* (2013.01); *H04N 5/23248* (2013.01)

(58) Field of Classification Search
  CPC .... H04N 5/772; H04N 5/907; H04N 5/23212; H04N 5/23248
  See application file for complete search history.

(56) References Cited

U.S. PATENT DOCUMENTS

| | | | | |
|---|---|---|---|---|
| 10,432,839 B2* | 10/2019 | Frank | ................... | F16M 13/04 |
| 2007/0279852 A1* | 12/2007 | Daniel | ................... | G06F 1/163 |
| | | | | 361/679.03 |
| 2008/0287769 A1* | 11/2008 | Kurzweil | ............. | A61B 5/0205 |
| | | | | 600/388 |
| 2010/0183297 A1* | 7/2010 | Barboutis | ............ | G02B 6/4206 |
| | | | | 398/16 |
| 2015/0304322 A1* | 10/2015 | Zaidi | .................... | H04W 12/06 |
| | | | | 382/115 |
| 2015/0309582 A1* | 10/2015 | Gupta | .................... | G06F 3/017 |
| | | | | 345/156 |
| 2015/0371215 A1* | 12/2015 | Zhou | ....................... | G06F 3/041 |
| | | | | 705/71 |
| 2016/0058375 A1* | 3/2016 | Rothkopf | ............ | A61B 5/0205 |
| | | | | 600/301 |
| 2016/0098138 A1* | 4/2016 | Park | ................... | H04M 1/7253 |
| | | | | 345/173 |
| 2016/0135516 A1* | 5/2016 | Cobbett | .................. | G06F 19/00 |
| | | | | 2/170 |
| 2016/0157779 A1* | 6/2016 | Baxi | .................... | A61B 5/0024 |
| | | | | 600/301 |
| 2016/0378071 A1* | 12/2016 | Rothkopf | ............... | G06F 3/016 |
| | | | | 368/10 |
| 2017/0163860 A1* | 6/2017 | Frank | ..................... | H04N 5/907 |
| 2018/0070824 A1* | 3/2018 | Cronin | ................. | A61B 5/6831 |
| 2018/0295895 A1* | 10/2018 | Donohoe | ........... | A61B 5/02055 |

FOREIGN PATENT DOCUMENTS

| WO | WO 2016/093915 A1 | 6/2016 | | |
|---|---|---|---|---|
| WO | WO-2016093915 A1 * | 6/2016 | ........... | A61B 5/0024 |

\* cited by examiner

BODY MOUNTED CAMERA SYSTEM

CROSS-REFERENCE TO RELATED APPLICATION(S)

This application is a continuation of U.S. patent application Ser. No. 15/342,068, filed Nov. 2, 2016 with the U.S. Patent and Trademark Office, which claims priority to U.S. Provisional Application No. 62/250,356, filed on Nov. 3, 2015, the entire contents of both of which are incorporated herein by reference.

BACKGROUND

1. Field

Embodiments of the present invention relate to wearable cameras.

2. Description of the Related Art

Wearable cameras have been increasing in use recently for both athletic and non-athletic situations. Many wearable cameras are bulky and/or uncomfortable to wear. Wearable cameras can also get in the way of or restrict movement of participants when playing sports such as basketball or doing other activities or sports that require a freedom of motion.

Additionally, many wearable cameras are clearly identifiable as such. When a wearable camera is clearly visible, it may make other participants uncomfortable or the camera may become the target of thieves.

SUMMARY

Embodiments of the present invention provide a body mounted camera system that is lightweight, comfortable, and substantially hidden from view.

According to an embodiment of the present invention, a body mounted camera system includes: a band structure having an inner surface positionable against a user's body, an outer surface facing away from the user's body, and an interior cavity between the inner surface and the outer surface; a camera within the interior cavity including a lens exposed through the outer surface of the band structure; a controller within the interior cavity for controlling the camera, the controller including an interconnection module for connecting to an outside device; a power source within the interior cavity for powering the controller and the camera; and electrical connections connecting the controller, the power source, and the camera.

The body mounted camera system may further include a substrate in the band structure on which at least two of the camera, the controller, and the power source are mounted.

The substrate may be flexible but not stretchable.

The electrical connections may include wires woven in a pattern that provides increased elasticity and flexibility.

The electrical connections may include ribbon cable providing flexibility.

The body mounted camera system may further include electro-magnetic shielding between the inner surface of the band structure and one or more of the power source, the camera, and the controller.

The body mounted camera system may further include a memory.

The memory may include a memory slot for inserting and removing a removable memory.

The memory may include a solid state memory or a flash memory.

The band structure may have an opening through which the camera, the controller, and the power source can be removed.

The opening may be closed by a fastener.

The interconnection module may include a micro-USB port.

The interconnection module may include a wireless connection module and a charge port.

The wireless connection module may include one or more of: a Bluetooth® module; a Wi-Fi® module; and a cellular module.

The controller may further include one or more of: a logical processor; an image stabilization module; an image processor; an on/off switch; and an autofocus controller.

The controller may further include one or more of: a GPS module; a gyrometer; an accelerometer; an altimeter; a pulse oximeter; and a pedometer.

The camera may further include a microphone.

The body mounted camera system may further include an elastic band.

The body mounted camera system may further include straps for attaching the body mounted camera system to a user's body.

The straps may use a hook and loop attachment method.

DETAILED DESCRIPTION

In the description that follows the same reference numbers are used to denote the same elements or components throughout.

A body mounted camera system according to embodiments of the present invention include a band structure and a camera, a controller, and a power supply hidden within the band structure. The camera includes a lens exposed to the outside for recording video or still pictures. In one embodiment the band structure is a fabric headband including an elastic band for holding the band structure on a user's head or arm.

Figure 1:
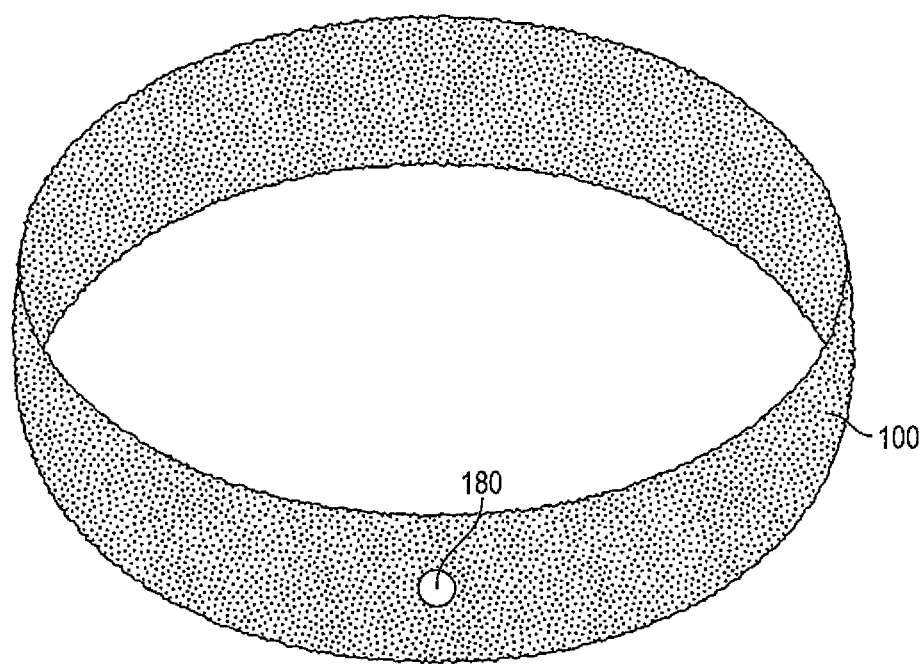
FIG. 1 is a perspective view of a body mounted camera system according to an exemplary embodiment of the present invention.

A body mounted camera system according an embodiment of the present invention will now be described with reference to FIGS. 1 and 2. FIG. 1 is a perspective view of a body mounted camera system according to the exemplary embodiment of the present invention and FIG. 2 is a perspective view of the body mounted camera system showing components hidden from view (in broken lines) according to the exemplary embodiment of the present invention.

Figure 2:
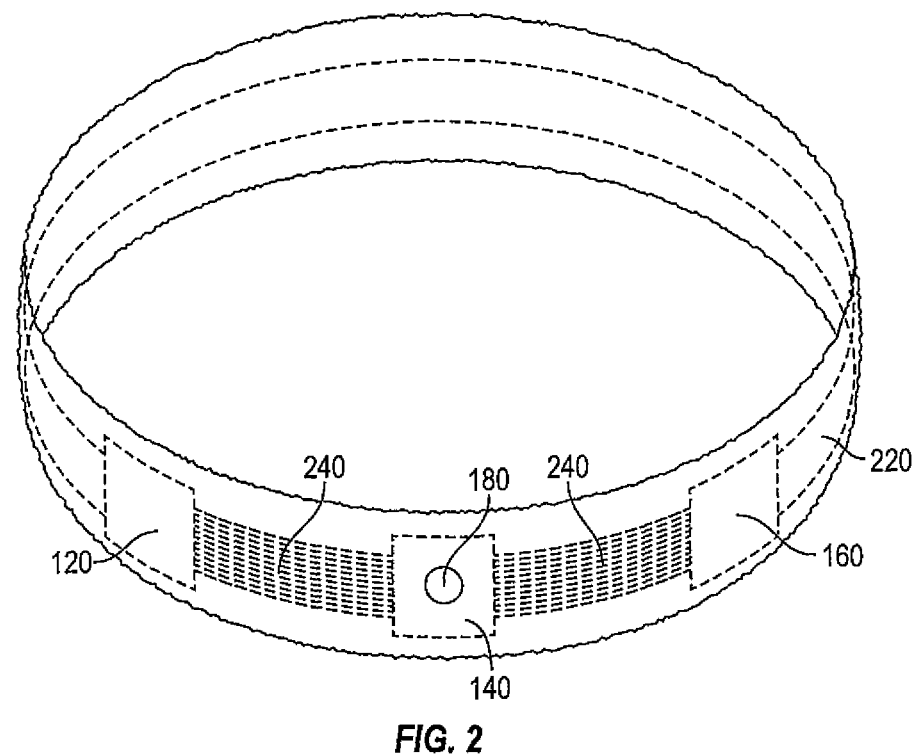
FIG. 2 is a perspective view of the body mounted camera system showing components hidden from view according to the exemplary embodiment of the present invention.

Referring to FIGS. 1 and 2, a body mounted camera system according to an embodiment of the present invention includes a band structure 100, a controller 120, a camera 140, and a power source 160. The camera 140 includes a lens 180 exposed to the outside of the band structure 100.

The band structure 100 includes an inner surface, an outer surface, and an inner cavity between the inner surface and the outer surface. The inner cavity of the band structure 100 houses the controller 120, the camera 140, and the power source 160. Further, the inner cavity of the band structure 100 may be annular in shape. The outer surface of the band structure 100 has a portion through which the lens 180 is exposed. The portion of the outer surface may be an opening or be made of an optically transparent (i.e., optically clear) material.

The band structure 100 may be made of any suitable material for making headbands or armbands. In some embodiments the band structure 100 is made of fabric or cloth and the fabric or cloth may be elastic.

The controller 120 is capable of controlling the camera 140. The controller receives power from the power source 160. The controller 120 controls the camera 140 to record video, take pictures, and/or end the recording of video. The controller 120 receives the pictures from the camera either in still or in motion video form. The controller may store the pictures and/or videos in memory 200 (see FIG. 3 and corresponding description herein). Alternatively, the controller may stream the still pictures and/or videos directly to an external device. The streaming may occur wirelessly using a suitable wireless technology. Suitable wireless technologies may include Bluetooth®, Wi-Fi®, or cellular (e.g., 2G, 3G, or 4G) technologies.

The controller 120 may include a charge port when the power source 160 is rechargeable. Further, the controller 120 may include an interconnection module. The interconnection module facilitates connection with the external device. The interconnection module may be any of various types of suitable interconnection modules, for example, a micro-USB port, a Bluetooth® module, a Wi-Fi®, module, or a cellular module. When the interconnection module is a micro-USB module, a separate charge port would not necessarily be provided.

The camera 140 may be any one of various types of cameras that provide a thin form factor, light weight, low power consumption, and capability of recording motion videos and/or taking still pictures. The camera 140 receives power from the power source 160.

The camera 140 includes the lens 180. The lens 180 is exposed to the outside through the portion of the outer surface of the band structure 100. In the embodiment where the portion of the outside surface is an opening, the lens 180 extends into the opening and the lens may be flush with the outer surface or may protrude from the outer surface. In the embodiment where the portion of the outside surface is an optically clear material, the lens is positioned to capture images and/or videos through the optically clear material. In some embodiments, the lens 180 and the band structure 100 are constructed so that the presence of the lens 180 is not easily seen by outside observers.

The camera 140 may include a microphone. Alternatively, a microphone (if included) may be part of the controller 120.

The body mounted camera system may include a plurality of cameras 140. The body mounted camera system may include two cameras 140 spaced apart from each other for creating three dimensional (3D) pictures or videos. The body mounted camera system may include multiple cameras 140 for creating pictures or videos from multiple angles and perspectives and/or virtual reality (360° pictures or videos). The controller 120 may be capable of merging pictures or video frames from the multiple camera into a single wide-angle, 3D, or 360° picture or video frame.

The power supply 160 may be any of various types of portable power supplies. For example, the power supply 160 may be a battery, a portable fuel cell, etc.

The body mounted camera system may include a substrate or support onto which the controller 120, the camera 140, the power source 160, or a combination thereof are mounted. The substrate may be any suitable material for mounting the controller 120, the camera 140, the power source 160, or a combination thereof which provides flexibility while preventing stretching. For example the substrate may be made of cloth or plastic. The substrate may be made of the same material as the band structure 100 but be processed differently to reduced stretchability.

The body mounted camera system may include electromagnetic shielding between the inner surface of the band structure 100 and one or more of the controller 120, the camera 140, and the power source 160. The shielding may prevent electric or magnetic fields from extending into the user (i.e., reaching the user). In some embodiments, the shielding is provided within the substrate.

The band structure 100 may include an opening for removing one or more of the controller 120, the camera 140, and the power source 160. The controller 120, the camera 140, and the power source 160 may be removed from the band structure 100 to permit washing of the band structure 100. By removing the controller 120, the camera 140, and the power source 160, the band structure 100 can be cleaned without damaging those components. When the controller 120, the camera 140, and the power source 160 are within the band structure 100, the opening may be closed using any of various suitable fastening structures (e.g., using a hook and loop or other attachment structure).

The body mounted camera system may or may not include an elastic band 220. When the body mounted camera system includes the elastic band 220, the elastic band 220 provides elasticity to the band structure 100. The elastic band 220 allows the body mounted camera system to be held in place in various locations of the users body. For example, the elastic band 220 may allow the band structure 100 to operate as a headband or armband.

When the body mounted camera system does not include the elastic band 220, the body mounted camera system may include other methods of fastening the band structure 100 to a user's body. In one embodiment the band structure 100 has straps that use a hook and loop attachment method (e.g., Velcro®) and can be attached to a user's head, arm, and/or other suitable body part by means of the hook and loop attachment method.

The controller 120, the camera 140, and the power source 160 are electrically connected via electrical connections 240. Electrical connections 240 provide electrical pathways for communication signals between the controller 120, the camera 140, and the power source 160. Electrical connections 240 may be a type of ribbon cable but the present invention is not limited thereto. When the electrical connections 240 are a type of ribbon cable, electrical connections 240 have good flexibility but low stretchability.

As can be seen in FIG. 1, neither the controller 120 nor the power source 160 are visible from the outside and only the lens 180 of the camera 140 is visible from the outside.

Figure 3:
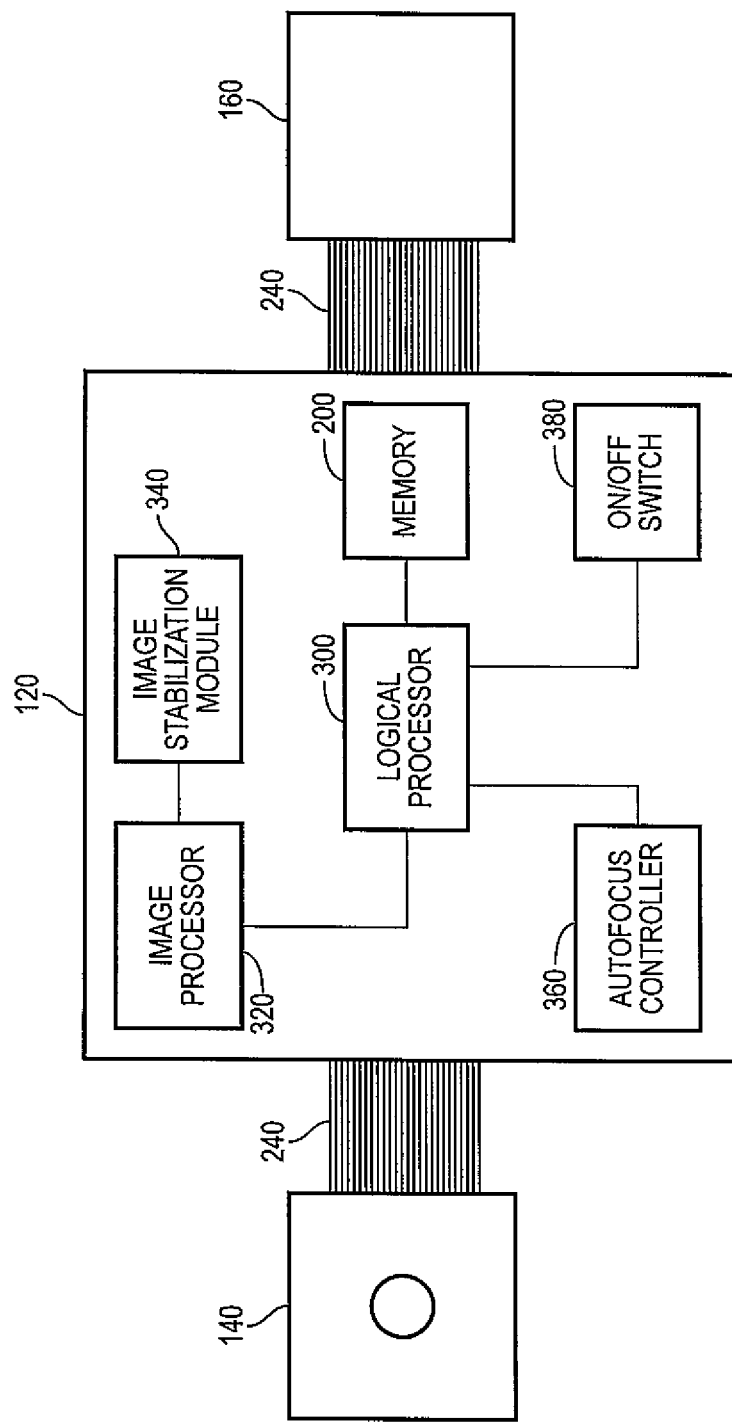
FIG. 3 is a block diagram of a controller, a camera, and a power source according to another exemplary embodiment of the present invention.

A controller, a camera, and a power source according to an embodiment of the present invention will now be described with reference to FIG. 3. FIG. 3 is a block diagram of a controller, a camera, and a power source according to the embodiment of the present invention.

Referring to FIG. 3, the camera 140 is connected to the controller 120 via electrical connections 240 and the controller 120 is connected to the power source 160 via electrical connections 240.

The controller 120 is capable of controlling the camera 140. The controller receives power from the power source 160. The controller 120 controls the camera 140 to record video, take pictures, and/or end recording of video. The controller 120 receives the pictures or videos from the camera. The controller stores the pictures and/or videos in memory 200.

The controller 120 according to the present embodiment includes the memory 200, a logical processor 300, an image processor 320, an image stabilization module 340, an autofocus controller 360, and an On/Off switch 380, but the present invention is not limited thereto. Embodiments of the present invention may include any combination of these components, including all or none of them.

The memory 200 may be an internal memory such as a flash memory or a solid state memory or may be a memory slot for inserting and removing a removable memory. The logical processor 300 may provide intercommunication between and control of the memory 200, the image processor 320, and the autofocus controller 360.

The image processor 320 may receive the picture or video frames from the camera 140 directly or may receive the picture or video frames from the logical processor 300 which receives the picture or video frames from the camera 140. The image processor 320 may process the picture or video frames and may compile the video frames into a single video.

The image processor 320 utilizes the image stabilization module 340 to stabilize (e.g., correct for motion blur, etc.) a video that was recording while the body mounted camera system was in motion.

Prior to sending the command to take a picture or video, or while taking a video, the logical processor 300 may issue a command to the autofocus controller 360 to focus the camera 140. When the autofocus controller 360 receives the command, the autofocus controller 360 controls the camera to automatically focus the camera.

The logical processor may control the camera 140, the power supply 160, the memory 200, the image processor 320, and the autofocus controller 360 to turn on or turn off according to input from the On/Off switch 380.

The controller 120 may further include one or more of a GPS module, a gyrometer, an accelerometer, an altimeter, a pulse oximeter, and a pedometer.

The controller and/or any other relevant devices or components according to embodiments of the present invention described herein may be implemented utilizing any suitable hardware, firmware (e.g. an application-specific integrated circuit), software, or a suitable combination of software, firmware, and hardware. The various components of the controller may be formed as one integrated device or as multiple separate devices. For example, the various components of the controller may be formed on one integrated circuit (IC) chip or on separate IC chips. Further, the various components of the controller may be implemented on a flexible printed circuit film, a tape carrier package (TCP), a printed circuit board (PCB), or formed on a same substrate as one or more circuits and/or devices of the body mounted camera system. Further, the various components of the controller may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Figure 4:
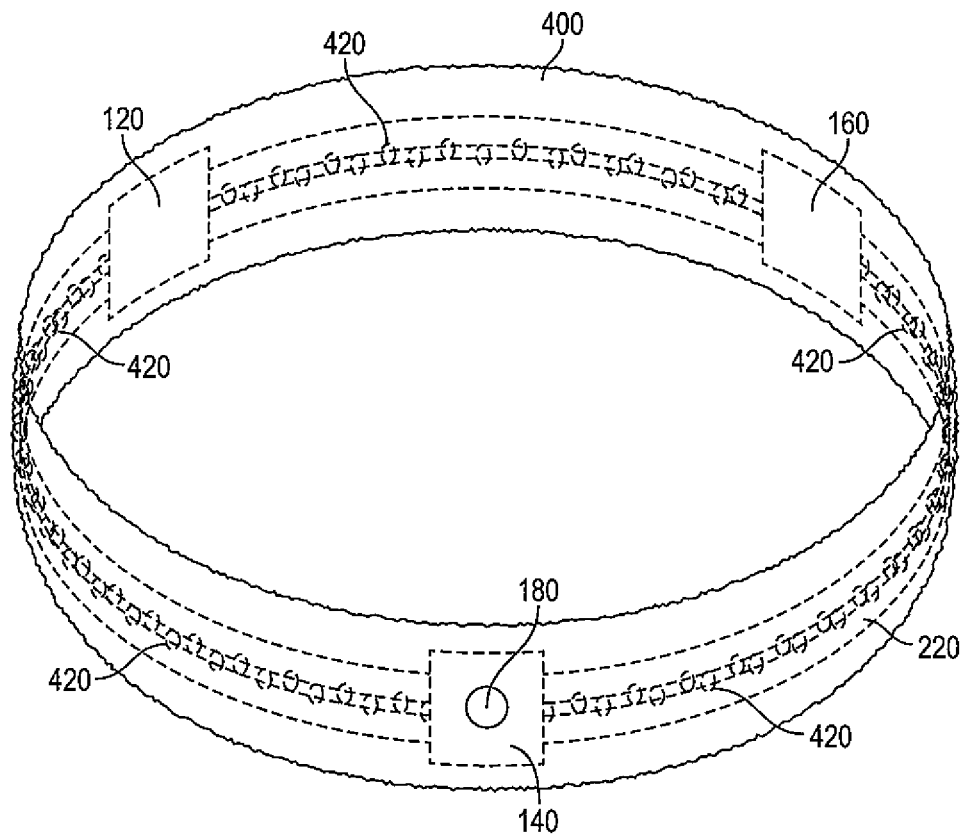
FIG. 4 is a perspective view of the body mounted camera system showing components hidden from view according to still another exemplary embodiment of the present invention.

A body mounted camera system according an embodiment of the present invention will now be described with reference to FIG. 4. FIG. 4 is a perspective view of the body mounted camera system showing components hidden from view according to the embodiment of the present invention. Some components of the body mounted camera system of FIG. 4 may be the same as components of the body mounted camera system of FIGS. 1-3 and, as such, duplicate descriptions of the same or similar elements or components thereof may be omitted.

Referring to FIG. 4, the body mounted camera system, according to the embodiment of the present invention, includes a band structure 400, a controller 120, a camera 140, and a power source 160. The camera 140 includes a lens 180 exposed to the outside of the band structure 400.

In this embodiment, the controller 120, the camera 140, and the power source 160 are spaced from each other. The spacing of the controller 120, the camera 140, and the power source 160 may provide better weight distribution and may make it easier for a user to wear the body mounted camera system.

When the body mounted camera system includes components that a spaced throughout the band structure 400 and the body mounted camera system includes an elastic band 220 the distance between the components may vary depending on the degree of stretching applied to the elastic band 220. In this case, electrical connections between the components may be damaged by the change in distance between the components.

According to the present embodiment, electrical connections 420 have high elasticity and flexibility. Any suitable method of providing electrical connections 420 with high elasticity and flexibility may be used.

Figure 5:
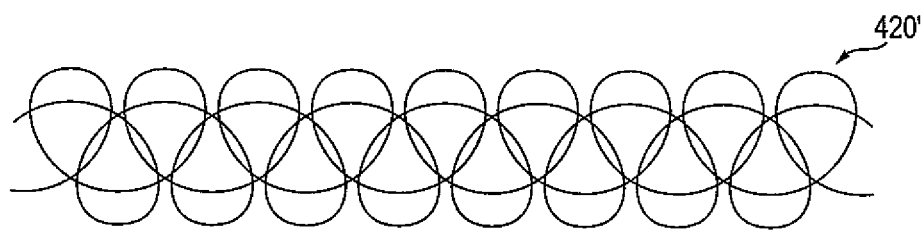
FIG. 5 is a plan view of electrical connections in a relaxed position according to an embodiment of the present invention.
Figure 6:
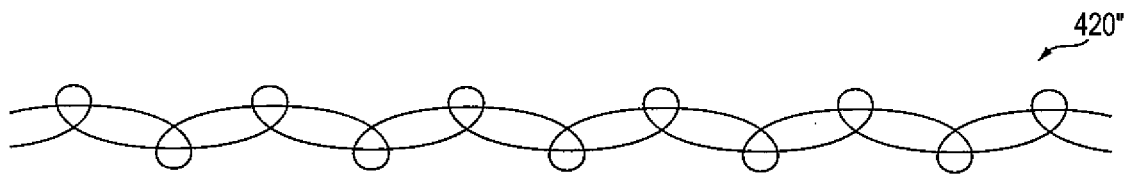
FIG. 6 is a plan of the electrical connections of FIG. 5 in a stretched condition.

FIGS. 5 and 6 are plan views of electrical connections having high elasticity and flexibility according to an embodiment of the present invention.

As can be seen in FIGS. 5 and 6, electrical connections 420 include wires 420' (e.g., wires with a metal core and plastic insulation coating) woven in a pattern. The pattern is chosen such that when a force is applied to stretch the electrical connections 420, the wires 420' are not broken. Rather they are bent or otherwise elastically deformed to create a suitable restoring force in the structure of the electrical connections 420.

FIG. 5 shows an exemplary pattern of wires 420' in a non-stretched position. FIG. 6 shows the wires 420'' in the exemplary pattern in a stretched position. As can be seen in FIG. 6, the wires 420" have smaller loops than the wires 420' and the loops in the wires 420" are spaced farther apart that the loops in the wires 420'.

When the force is no longer being applied to the electrical connections 420, the loops in the wires 420" relax back to the size of the loops in the wires 420', and because of this, the loops are brought closer together.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "one or more of," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

It will be understood that when an element or layer is referred to as being "on," "connected to," "coupled to," "connected with," "coupled with," or "adjacent to" another element or layer, it can be "directly on," "directly connected to," "directly coupled to," "directly connected with," "directly coupled with," or "directly adjacent to" the other element or layer, or one or more intervening elements or layers may be present. Further "connection," "connected," etc. may also refer to "electrical connection," "electrically connect," etc. depending on the context in which they are used as those skilled in the art would appreciate. When an element or layer is referred to as being "directly on," "directly connected to," "directly coupled to," "directly connected with," "directly coupled with," or "immediately adjacent to" another element or layer, there are no intervening elements or layers present.

As used herein, the term "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Although this invention has been described in certain specific embodiments, those skilled in the art will have no difficulty devising variations to the described embodiment, which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents.

What is claimed is:

1. A body mounted camera system comprising:
a band structure having an inner surface configured to face toward a user's head, an outer surface configured to face away from the user's head, and an interior cavity between the inner surface and the outer surface;
at least one camera within the interior cavity, the at least one camera comprising a lens exposed through the outer surface of the band structure;
a controller within the interior cavity for controlling the at least one camera, the controller comprising an interconnection module configured to connect to an outside device;
a power source within the interior cavity configured to power the controller and the at least one camera;
electrical connections connecting the controller, the power source, and the at least one camera;
an opening in the band structure through which the at least one camera, the controller, the power source, and the electrical connections can be removed; and
wherein the at least one camera, the controller, the power source, and the electrical connections are circumferentially arranged within the interior cavity of the band structure.

2. The body mounted camera system of claim 1, wherein the band structure is flexible.

3. The body mounted camera system of claim 2, wherein the band structure is a washable fabric band structure.

4. The body mounted camera systems of claim 1, further comprising a fastener configured to close the opening in the band structure.

5. The body mounted camera system of claim 1, further comprising a substrate within the interior cavity of the band structure on which at least two of the at least one camera, the controller, and the power source are mounted.

6. The body mounted camera system of claim 5, wherein the substrate is flexible but not stretchable.

7. The body mounted camera system of claim 1, wherein the electrical connections comprise wires woven in a pattern configured to provide elasticity and flexibility.

8. The body mounted camera system of claim 1, wherein the electrical connections comprise a flexible ribbon cable.

9. The body mounted camera system of claim 1, further comprising electro-magnetic shielding between the inner surface of the band structure and one or more of the power source, the at least one camera, and the controller.

10. The body mounted camera system of claim 1, wherein the at least one camera comprises a plurality of cameras.

11. The body mounted camera system of claim 1, further comprising a memory device in the interior cavity of the band structure, the memory device comprising a memory slot for inserting and removing a removable memory.

12. The body mounted camera system of claim 1, further comprising a memory device in the interior cavity of the band structure, the memory device comprising a solid state memory or a flash memory.

13. The body mounted camera system of claim 1, wherein the interconnection module comprises a micro-USB port.

14. The body mounted camera system of claim 1, wherein the interconnection module comprises:
a wireless connection module; and
a charge port.

15. The body mounted camera system of claim 14, wherein the wireless connection module comprises one or more of:

a short range wireless module;
a wireless module; or
a cellular module.

16. The body mounted camera system of claim 1, wherein the controller further comprises one or more of:
a logical processor;
an image stabilization module;
an image processor;
an on/off switch; or
an autofocus controller.

17. The body mounted camera system of claim 1, wherein the controller further comprises one or more of:
a GPS module;
a gyrometer;
an accelerometer;
an altimeter;
a pulse oximeter; or
a pedometer.

18. The body mounted camera system of claim 1, wherein the at least one camera further comprises a microphone.

19. The body mounted camera system of claim 1, further comprising an elastic band in the interior cavity of the band structure.

20. The body mounted camera system of claim 1 further comprising at least one strap coupled to the band structure, the at least one strap configured to attach the body mounted camera system to a user's body.

* * * * *